United States Patent [19]

Mikami

[11] Patent Number: 4,652,053
[45] Date of Patent: Mar. 24, 1987

[54] SEAT BELT APPARATUS FOR A VEHICLE SEAT

[76] Inventor: Tatuya Mikami, 202 Yamaoka-Mansion, 3-1-6, Nakakasai, Edogawa-ku, Tokyo, Japan

[21] Appl. No.: 707,118

[22] Filed: Feb. 28, 1985

[30] Foreign Application Priority Data

| Mar. 9, 1984 [JP] | Japan | 59-43867 |
| Aug. 29, 1984 [JP] | Japan | 59-178514 |
| Sep. 14, 1984 [JP] | Japan | 59-191596 |

[51] Int. Cl.⁴ .................................................. A62B 35/00
[52] U.S. Cl. .................................... 297/484; 297/483
[58] Field of Search ............... 297/484, 483, 468, 473, 297/474

[56] References Cited

U.S. PATENT DOCUMENTS

| 2,195,334 | 3/1940 | Lethern | 297/484 |
| 2,292,386 | 8/1942 | Manson | 297/484 |
| 2,634,802 | 4/1953 | Stumm | 297/484 |
| 3,639,000 | 2/1972 | Keltner | 297/484 X |

FOREIGN PATENT DOCUMENTS

| 2400992 | 10/1974 | Fed. Rep. of Germany | 297/483 |
| 301199 | 9/1965 | Netherlands | 297/484 |

Primary Examiner—Peter A. Aschenbrenner
Attorney, Agent, or Firm—Nilsson, Robbins, Dalgarn, Berliner, Carson & Wurst

[57] ABSTRACT

A vehicle seat is disclosed, which comprises a base, a seating section supported on the base, a back support section disposed adjacent to the seating section and supported by the base at two vertically spaced apart positions such that it is rotatable in the forward and rearward directions relative to the seating section, and a head support section disposed above and mounted on the back support section. The seat has a pair of shoulder belts each having an upper end attached to the top of the back support section such that it is turned toward each side thereof and movable along the back support surface thereof and a lower end movably attached to each side of the back support section. Shoulder belt attaching units for the upper and lower ends of the shoulder belts permit adjustment of the positions of attachment of the belts in the horizontal and vertical directions. Buffer means permit the upper end of each shoulder belt to be withdrawn when the belt is pulled.

7 Claims, 8 Drawing Figures

SEAT BELT APPARATUS FOR A VEHICLE SEAT

BACKGROUND OF THE INVENTION

This invention relates to a seat for a vehicle and, more particularly, to a vehicle seat with a safety belt for protecting a passenger.

A vehicle seat having a seating section and a back support section, as employed in vehicles, is usually provided with a safety belt for protecting the passenger from being flung about or flung out of the vehicle in case of a collision. The safety belt, comprises a waist belt section for holding the passenger's waist and a diagonal belt section united to the waist belt section and extending diagonally over the passenger's chest. The one end of the safety belt is fixed to the one side of the seat and the other end is fixed to a ceiling of the vehicle. When the safety belt is used, it is fastened at its intermediate portion with a suitable fastening means. This is called a three-point seat belt. Since this type of seat belt has only one fastening point, it can be easily handled, so that it can be widely used in vehicles. This three-point seat belt, however, is not employed for buses and airplanes because the seat belt is attached from the ceiling, which makes it inconvenient for the passenger.

Nevertheless, the three-point seat belt cannot sufficiently protect the passenger at the time of a collision. More specifically, only one of the passenger's shoulders is secured by the three-point seat belt from moving in a forward direction, while the other shoulder is free and unprotected. In addition, if the three-point seat belt is used incorrectly, for instance, a diagonal section of the belt is located near the passenger's neck, which is liable to cause tightening by this section at the time of a collision. Further, in ordinary use of the three-point seat belt, the passenger's chest is pressed by the diagonal section of the belt which creates discomfort. Furthermore, the passenger cannot be sufficiently protected against shocks other than a turndown or rocking of the seat.

Cars used in a car race or rally employ safety belts having four or more fastening points. These safety belts having a greater number of fastening points, however, restricts free motion in daily driving. Besides, it is rather cumbersome to handle the belt. Even if these safety belts are adapted to cars used for daily driving, they are impractical.

SUMMARY OF THE INVENTION

An object of the invention is to provide a vehicle seat which ensures a comfortably long distance drive, decreases the pressure applied to the passenger's chest allows shoulder belt attaching units to be easily installed on a back support section, and includes a safety belt which can be conveniently used and securely holds the passenger in the vehicle seat even at the time of an accident.

According to the invention, there is provided a vehicle seat, which comprises a base, a seating section supported on the base, a back support section disposed adjacent to the seating section and supported by the base at two vertically spaced-apart positions such that it is rotatable relative to the seating section in the forward and rearward directions, and a head support section disposed above and mounted on the back support section the back support section has a back support surface and a pair of side surfaces and a top surface substantially perpendicular to the back support surface. The seat has a pair of shoulder belts each having an upper end attached to the top of the back support section in the vicinity of the head support section and a lower end attached to each side of the back support section. First shoulder belt attaching means rotatably attaches the upper end of each shoulder belt to the top of the back support section and is capable of position adjustment in the longitudinal direction of the top surface of the back support section. Second shoulder belt attaching means attaches the lower end of each shoulder belt to each side of the back support section and is capable of position adjustment in the longitudinal direction of the side surface of the back support section.

The vehicle sheet according to the invention employs shoulder belts, which, unlike the prior art three-point safety belt, can securely hold both the passenger's shoulders in the seat so that the passenger can be safely protected during collision.

DETAILED DESCRIPTION OF THE PREFERRED EMBODIMENTS

An embodiment of the seat according to the invention applied to a vehicle will now be described with reference to FIGS. 1 to 6.

Figure 1:
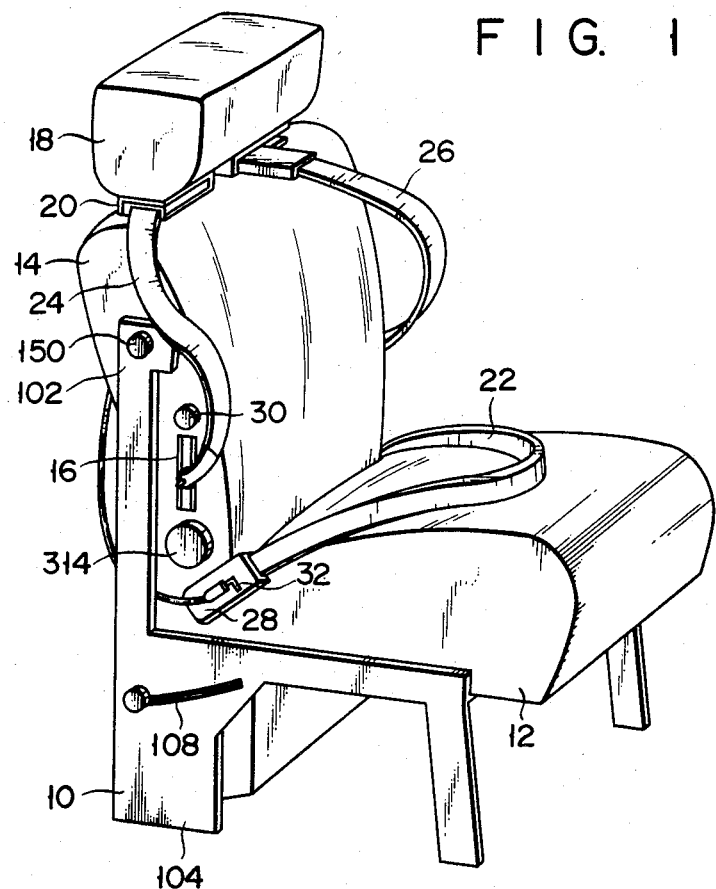
FIG. 1 is a perspective view showing an embodiment of the vehicle seat according to the invention.

FIG. 1 schematically shows the seat. The seat illustrated has a base 10, on which a seating section 12 is movably mounted in the forward and backward directions. On the rear of the seating section 12, a back support section 14 is coupled to the seating section 12. The backrest or back support section 14 is mounted on the base 10 at two positions, i.e., upper and lower positions such that it is rotatable by a predetermined angle with respect to the seating section 12. Each side of the back support section 14 is provided with a shoulder belt lower end attaching unit 16 for securing the lower end of a shoulder belt to be described later. A headrest or head support section 18 is mounted on top of the back support section 18 such that it can be displaced in vertical directions with respect thereto. Shoulder belt upper end attaching units 20 are provided between the head support section 18 and back support section 14 separate upper attaching units 20 and lower attaching units 16 are provided on each lateral side of the vehicle seat with the lateral direction extending horizontally from side to side across said seat perpendicular to the forward direction in which the seat faces.

The seat has a waist belt 22 and a pair of left and right shoulder belts 24 and 26. The waist belt 22 serves to hold the passenger's waist relative to the seat. The shoulder belts 24 and 26 serve to hold the passenger's shoulders relative to the seat. In FIG. 1, the shoulder belt 24 is shown in its position in use, while the other shoulder belt 26 is shown in its position out of use. One end of the waist belt 22 is attached to a lower portion of one side of the back support section 14 by a suitable attaching unit 28. The attaching unit 28 includes a belt accommodating mechanism and a belt securing mechanism. With these mechanisms, the waist belt 22 is accommodated in the attaching unit 28 when it is out of use its length is adjustable in ordinary use, and it is secured. The other end of the waist belt 22 is removably attached to a lower portion of the other side of the back support section 14 by a suitable attaching unit when the belt is in use. The upper end of each of the shoulder belts 24 and 26 is attached to each upper end attaching unit 20 provided between the head support section 18 and back support section 14, while its lower end is attached to each lower end attaching unit 16 provided on each side of the back support section 14.

The upper end attaching unit 20 for the shoulder belt 24 will be described hereinafter in detail with reference to FIGS. 2 and 3. Wherein the upper end attaching unit for the shoulder belt 26 has the same structure as the upper end attaching unit 20 for the other shoulder belt 26. The description of the upper end attachment unit for the shoulder belt 26 is eliminated.

Figure 2:
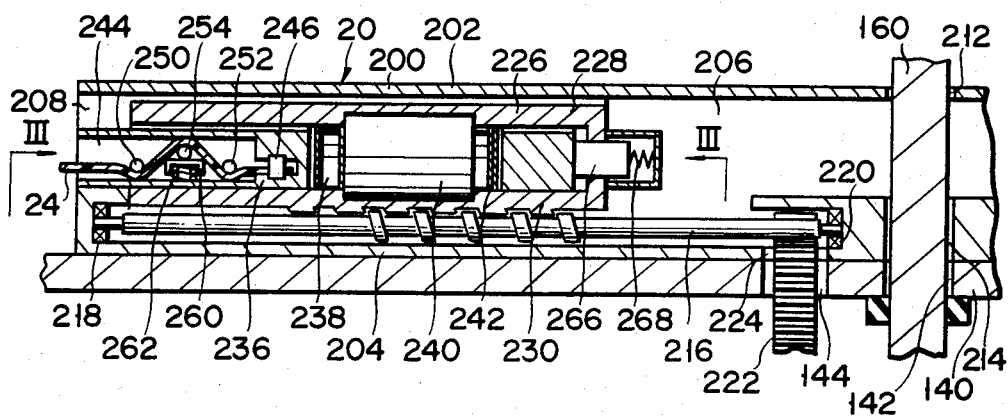
FIG. 2 is a sectional view showing a shoulder belt upper end attaching unit shown in FIG. 1.
Figure 3:
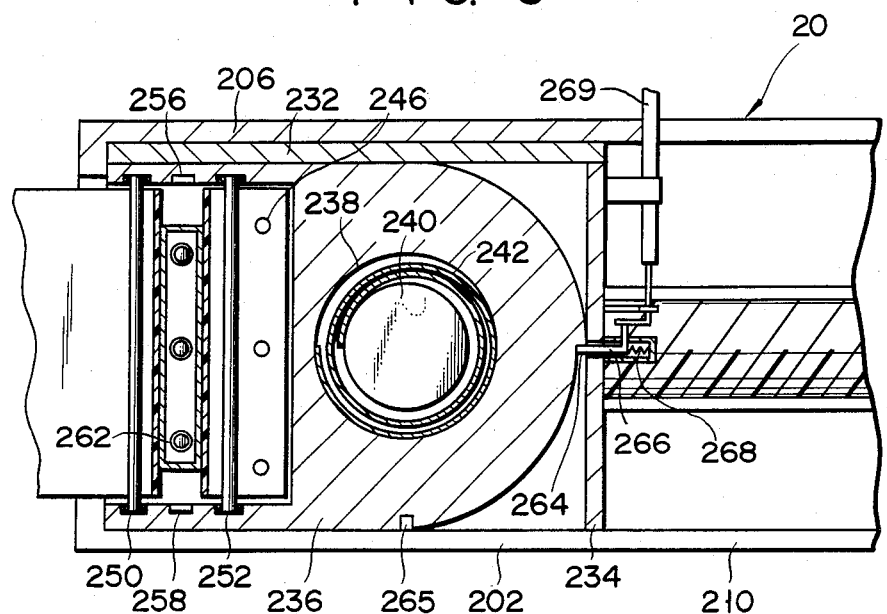
FIG. 3 is a sectional view taken along line III—III in FIG. 2.

As shown in FIG. 2, the upper end attaching unit 20 has a box-like hollow housing 200, which is secured to a frame 140 at the top part of the back support section 14. The housing 200 has upper and lower plates 202 and 204 and side plates 206. As shown in FIG. 2, each side of the housing 200 has an opening 208. Also, as shown in FIG. 3, the front of the housing 200 has an opening 210. The upper and lower plates 202 and 204 of the housing 200 respectively have through holes 212 and 214 formed substantially in a central portion. A support pole 160 of the head support section 16 is inserted through the through holes 212 and 214. The support pole 160 is mounted for movement in vertical directions with respect to the frame 140 of the back support section 14. A feed screw 216 is provided in the lower plate 204 in the longitudinal direction of the housing 200. The opposite ends of the feed screw 216 is supported in the lower plate 204 via bearings 218 and 220. Feed screw 216 meshes with a female threaded portion 225 on the lower plate 230 of the slidable member 226 for moving the slidable member 226 by rotation of the feed screw 216. A belt 222 with teeth is passed round a portion of the feed screw 216 near the inner end thereof. The belt 222 with teeth extends downwardly through a through hole 224 formed in a side plate 204 and a through hole 144 formed in the frame 140 of the back support section 14. The belt 222 with teeth is driven by a handling member 30 which is mounted on the corresponding side of the back support section 14 as shown in FIG. 1.

A box-like hollow sliding member 226 is disposed between the lower plate 204 and the upper plate 206 of the housing 200. As shown in FIG. 2, the sliding member 226 has upper and lower plates 228 and 230. Also, as shown in FIG. 3, the sliding member 226 has a first plate 232, which is provided between the upper and lower plates 228 and 230 and faces the side plate 206 of the housing 200, and a second plate 234 extending perpendicular to the first plate 232. A rotary member 236 is disposed in a space defined by the first and second plates 232 and 234 and upper and lower plates 228 and 230 of the sliding member 226. The rotary member 236 has a through hole 238 formed in its central portion. A post 240 is disposed in a central position of the through hole 238 and secured to the sliding member 226. A spiral spring 242 is disposed between the post 240 and rotary member 236, with its opposite ends attached to the post 240 and rotary member 236. The spiral spring 242 biases the rotary member 236 in a clockwise direction in FIG. 3.

As shown in FIG. 2, the rotary member 236 has a groove 244 facing the opening 208 of the housing 200. The shoulder belt 24 is inserted in the groove 244, and it is secured by a plurality of secure members 246 to the rotary member 236.

A buffer mechanism for the shoulder belt 24 is provided in the groove 244. The buffer mechanism has two stationary rollers 250 and 252 for holding the shoulder belt 24 relative to the rotary member 236. A movable roller 254 is provided between the two stationary rollers 250 and 252. The movable roller 254 can be guided for movement in vertical directions along a pair of grooves 256 and 258 formed in the rotary member 236. High frictional force members are provided in the grooves 256 and 258 so that the movable roller 254 cannot be readily moved downwards. A cup-like member 260 is provided under the movable roller 254, and a compression coil spring 262 is provided between the cup-like member 260 and rotary member 230. The shoulder belt 24 is biased upwards by the compression coil spring 262.

The rotary member 236 has a circular end opposite to the end, to which the shoulder belt 24 is attached. The rotary member 236 thus can be rotated without its circular end touching the first and second plates. The edge of the circular end of the rotary member 236 is formed with notches 264 and 265 for holding the rotary member 236 in the sliding member 226 when the shoulder belt 24 is both in and out of use. A pin 266 is inserted in a central portion of the second plate 234. The pin 266 is biased by a compression coil spring 268 such that it is held in forced contact with the rotary member 236. The notch 264 has such a shape that it permits free rotation of the rotary member 236 in the counterclockwise direction. When the rotary member 236 is rotated in the counterclockwise direction while the use of the shoulder belt 24 is discontinued, the pin 266 is engaged in the notch 265. The rotatary member 236 is prevented from being rotated counterclockwise by the engagement of the pin 266 with the groove 265 of the rotary member 236. When the Bowden cable 269 is operated against the force of spring 268, the pin 266 is disengaged from the groove 265 of the rotary member 236. And, the rotary member 236 is rotated clockwise by the spiral coil 242. As a result, the rotary member 236 is returned to the original position at which the pin 266 is engaged with the groove 264 of the rotary member 236, as shown in FIG. 3. In this way, the rotary member 236 rotates the shoulder belt 24 abot 90 degrees from the position of the shoulder belt 24 shown in FIG. 3 to the position of the shoulder belt 26 shown in FIG. 1 with the pole 240 as a rotational axis.

Figure 4:
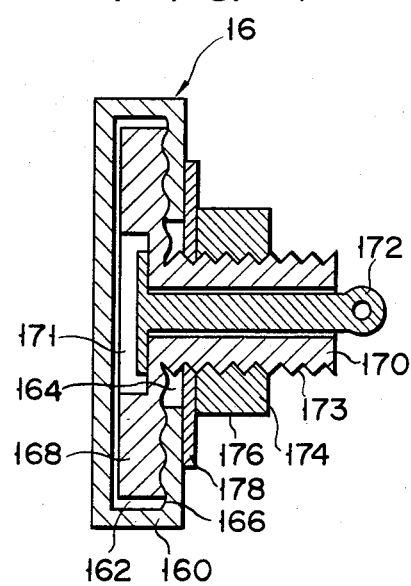
FIG. 4 is a sectional view showing a shoulder belt lower end unit shown in FIG. 1.

The lower end attaching unit 16, as shown in FIG. 4, has a housing 160. The housing 160 is secured to the corresponding side of the back support section 14, and it has an inner space 162 and an opening 164. The inner wall of the space 164 of the housing 160 adjacent to the opening 164 has a wave surface 166. A slide member 168 is inserted in the housing 160. A head portion of the slide member 168, which is accommodated in the space 162 of the housing 160 has a wave surface facing the wave surface 166 of the housing 160. The slide member 168 has a projecting portion 170 projecting from its head portion toward the outside of the housing 160, and also having a longitudinally see-through circular space 171 consisting of a large diameter space and a small diameter space. A securing member 172 is inserted in the circular space 171. The securing member 172 has a large diameter portion and a small diameter portion, the diameters of these portions being smaller than those of the respective large and small diameter spaces. The securing member 172 has a hole formed adjacent to its end opposite to the large diameter portion. A suitable mounting member provided at the lower end of the shoulder belt 16 is inserted through the hole as noted above. The outer periphery of the projecting portion of the slide member 168 has a thread 173. A nut 174 is screwed on the thread 173. The outer periphery 176 of the nut 174 is machined such as to prevent a slip handled by the passenger. A washer 178 is provided between the nut 174 and housing 160.

The initial setting of the shoulder belt in the above arrangement will now be described.

The upper end of the shoulder belt 24 or 26 is attached to the rotary member 236 of the upper end attaching unit 20. When the shoulder belt 24 or 26 is out of use, the rotary member 236 is held in contact with the first plate 232 of the sliding member 226 by the spiral spring 242. The lower end of the shoulder belt 25 or 26, on the other hand, is attached to the lower end attaching unit 16. Thus, the shoulder belt 24 or 26 is disposed along the corresponding side of the back support section 16. When using the shoulder belt 24 or 26, the passenger inserts a hand between each shoulder belt 24 or 26 and corresponding side of the back support section 16, similar to wearing a knapsack. When each shoulder belt 24 or 26 is worn, its upper end is turned by the rotary member 236 to be perpendicular to the shoulder line of the passenger. The pin 264 is inserted into the notch 265 by the compression coil spring 268, whereby the rotary member 236 is held in a position, at which the shoulder belt is in use. When a handling member 30 (see FIG. 1) is turned by the passenger, the sliding member 226 is moved along the housing 200 by the mesh between the belt 222 with teeth and the feed screw 216. In this way, the transversal positions of the shoulder belts 24 and 26 can be adjusted. When the nut 174 on each lower end attaching unit 16 is turned, the engagement between the wave surface 166 of the housing 160 and associated wave surface of the side member 162 is loosened or released, so that the slide member 168 can be moved in the housing 160. When the nut 174 is turned in the opposite direction, the wave surface 166 of the housing 160 and associated wave surface of the side member 168 are engaged again. In the above way, the vertical position of the lower end of each of the shoulder belts 24 and 26 can be adjusted along each side of the back support section 16.

When discontinuing the use of the shoulder belts 24 or 26, the passenger operates a lever 32 (see FIG. 1) provided at one end of a Bowden cable 269, whereupon the pin 266 is released from the notch 265 of the rotary member 236 and, as a result, one end of the rotary member 236 is brought into forced contact with the first plate 232 of the sliding member 266 by the spiral spring 242. Thereafter, the passenger retreats each arm from between the back support section 16 and each of the shoulder belts 24 and 26.

When the shoulder belts 24 and 26 attached to the upper and lower end attaching units 16 and 20 are used, the upper half of the passenger can be held in position against shocks caused by a collision.

In addition to the provision of the waist belt and shoulder belts, the height of the head support section 18 can be adjusted by displacing the back support section 14. This will now be described with reference to FIGS. 5 and 6.

Figure 5:
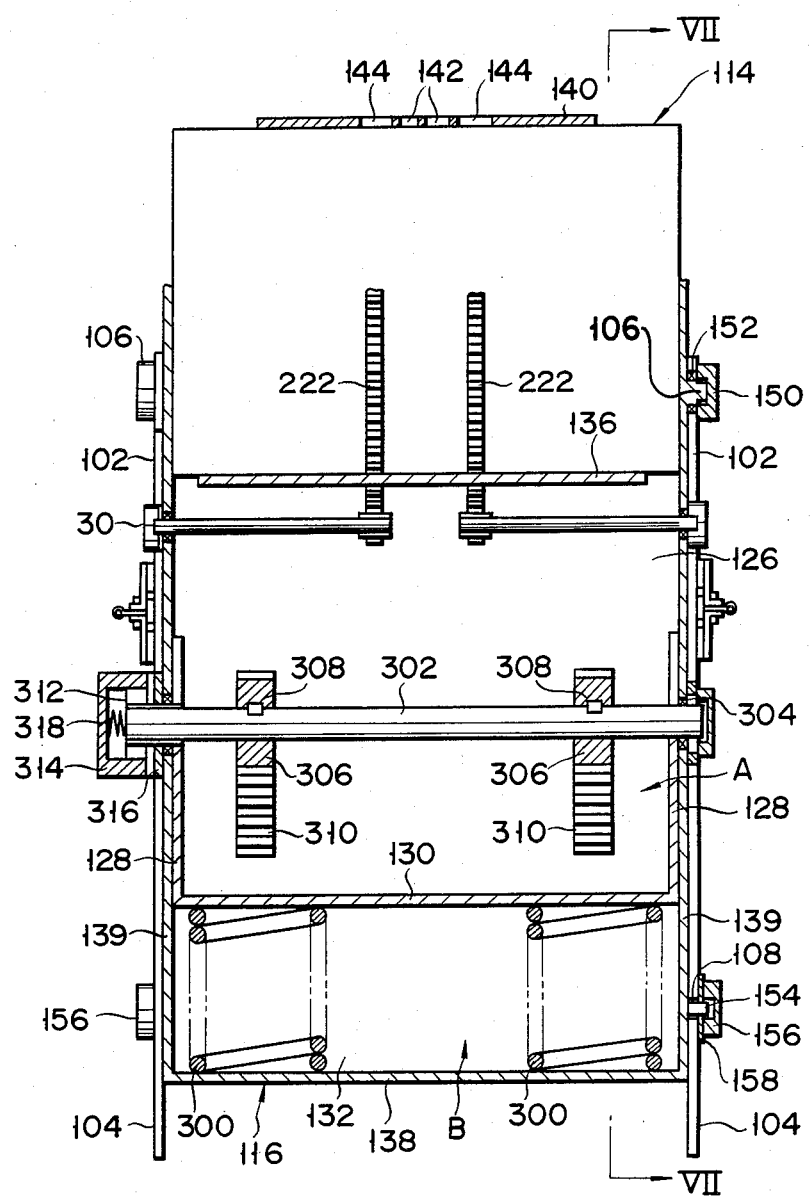
FIG. 5 is a sectional view showing a back support section shown in FIG. 1.
Figure 6:
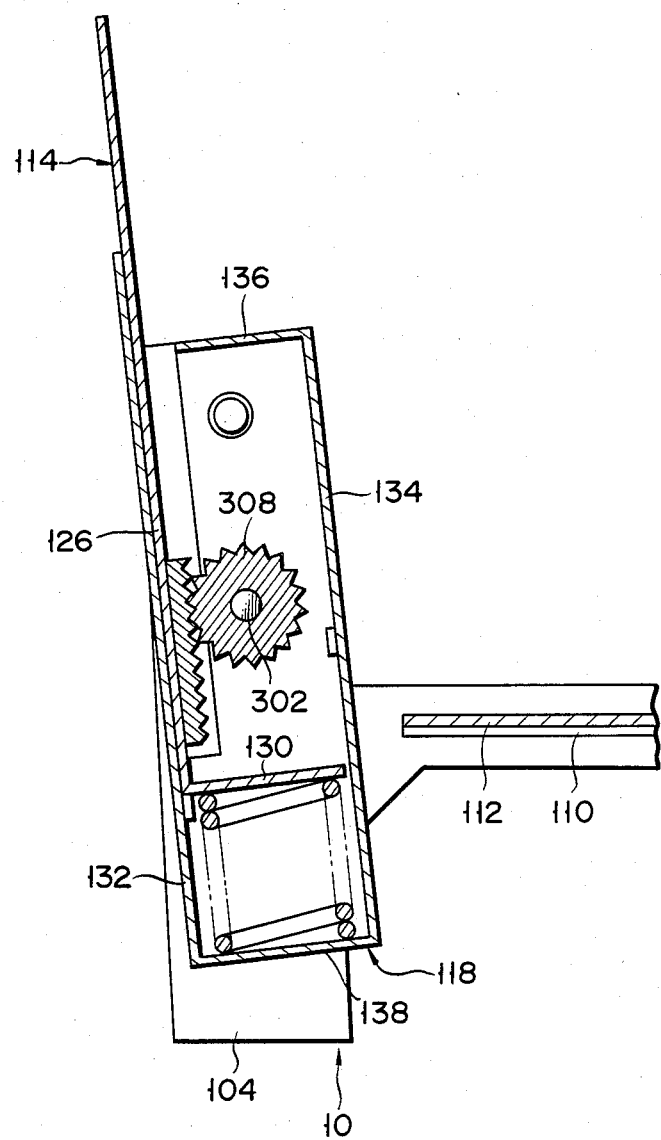
FIG. 6 is a sectional view taken along line VII—VII in FIG. 5 showing the back support section.

FIGS. 5 and 6 show the seating section 12 and the back support section 14 in which the head support section 18 and the cushion members of the seating section 12 and the back support section 14 removed.

The base 10 has a pair of upper members 102 and a pair of lower members 104, as shown in FIGS. 1 and 5. Each upper member 102 is rearwardly inclined by an angle greater than 90° with respect to a portion of each lower member 104 extending along the seating section 12. Each upper member 102 has a through hole 106, and each lower member 104 has a slit 108 (see FIG. 1). As shown in FIG. 6, each lower member 110 has an integral inner member 110, on which a seating section support plate 112 is provided. The seating section support plate 112 is movable in the forward and backward directions between the pair of lower members 104. The back support section 14 includes an upper member 114 and a lower member 116. Although not shown, the seating section support plate 112 is coupled by suitable coupling means to the lower member 116 of the back support section 14. The upper member 116 has the frame 140 shown in FIG. 2. As described in FIG. 2, the frame 140 has a pair of the through holes 142 and a pair of the grooves 144, and the support poles 160 of the head support section and belts 222 with teeth are inserted in the through holes 142 and grooves 144, respectively. The upper member 114 has a back plate 126, a pair of side plates 128 and a bottom plate 130. The lower member 116 has a back plate 132, a front plate 134, upper and lower plates 136 and 138 and a pair of side plates 139. A space that is defined by the back plate 132, front plate 134, upper and lower plates 136 and 138 and pair side plates 139, is divided by the bottom plate 130 of the upper member 114 into an upper space A and a lower space B.

Each of the side plates 139 of the lower member 116 has an upper support projection 150, which is rotatably supported in the base 10 via a bearing 152 provided in the through hole 106 formed in the base 10. The lower member 116 is thus rotatable about the upper projections 150 with respect to the base 10. Each of the lower members 116 has a lower support projection 154, which penetrates the corresponding slit 108 in the base 10 and is secured to the base 10 by a lock nut 156 and a washer 158.

In case of a vehicle collision, a bending moment about the upper support projections 150 is produced in the upper part of the back support section 14 due to the moment of the back support section 14 in the forward direction of the seat. However, since the lower support projections 154 are secured to the base 10, the upper part of the back support section 14 is prevented from being rotated by this bending moment. In other words, with the seat, the two mounting positions of the lower member 116 with respect to the base 10, i.e., the upper and lower support projections 152 and 154, are spaced apart a great distance, so that the back support section 14 is held firmly secured to the base 10 in case of a collision.

A mechanism for moving the upper member 114 in the lower member 116 will now be described. A pair of compression coil springs 300 are provided in the space B noted above. More specifically, the compression coil springs 300 are provided between the lower plate 138 of the lower member 116 and the bottom plate 130 of the upper member 114. A shaft 302 is provided in the space A noted above. The shaft 302 is supported in the lower member 116 via bearings 304. A pair of pinion gears 306 are secured by keys 308 to the shaft 302. Each pinion gear 306 is meshing with a rack 310 mounted on the upper member 114. The shaft 302 has a spline shaft portion 312, with which a coupling member 314 is coupled. A top gear 316 is provided between the coupling member 314 and lower member 116. A tension coil spring 318 is provided between the coupling member 314 and shaft 302.

With this mechanism, by pulling the coupling member 314 against the force of the tension coil spring 318, the coupling member 314 and top gear 316 are de-coupled from each other, so that the coupling member 314 can be manually turned to cause rotation of the shaft 302 which is engaged to the coupling member 314. The rotation of the shaft 302 causes movement of the pinion gears 306 in the vertical directions along the racks 310. In this way, the upper member 114 can be vertically moved in and with respect to the lower member 116.

It is to be noted that according to the invention the back support section 14 has two support members, i.e., upper and lower members 114 and 116 with the upper member 114 movable with respect to the lower member 116, so that the passenger can readily adjust the height of the back support section 14. Further, where the upper end of the shoulder belts 24 and 26 are attached, the vertical position can be adjusted to suit a passenger of any height even if the seat is adjusted for someone of a different size.

The drive mechanism of the back support section shown in FIGS. 5 and 6 has used the pinion gears 308 and racks 310. However, this is by no means limitative, and it is possible to use other drive mechanisms such as a combination of bevel gears and feed gears.

Figure 7:
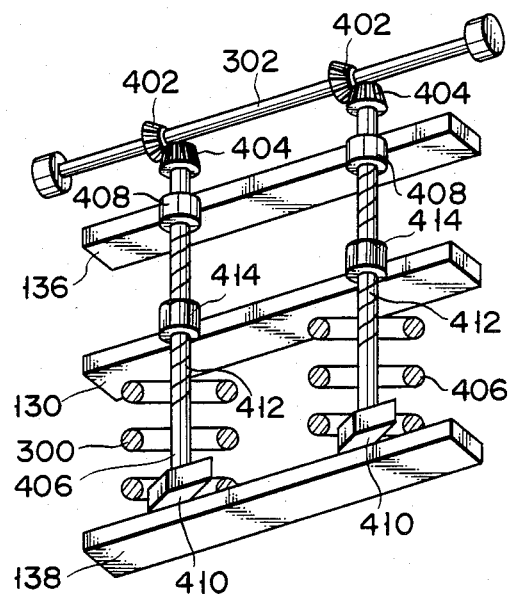
FIG. 7 is a perspective view showing a modification of a drive mechanism of the back support section shown in FIGS. 5 and 6.

FIGS. 7 shows a drive mechanism of the back support section, which utilizes a combination of bevel gears and feed gears. More specifically, the mechanism shown in FIG. 7 includes a pair of bevel gears 402 secured to shaft 302. These bevel gears 402 are in mesh with respective bevel gears 404 provided on the upper end of pair shafts 406. Each of the shafts 406 is rotatably supported by bearings 408 and 410 secured to the upper and lower plates 136 and 138 of the lower member 116. Each shaft 406 has a feed screw 412 formed in its intermediate portion. Each feed screw 412 is in mesh with a nut 414 secured to the bottom plate 130 of the upper member 114.

With this mechanism, by manually turning the shaft 302, the upper member 114 can be vertically moved with respect to the lower member 116 via the bevel gears 402 and 404, feed screws 412 of the shafts 406 and nuts 414.

According to the invention, the drive mechanism of the back support section may utilize a suitable compressed air source.

Figure 8:
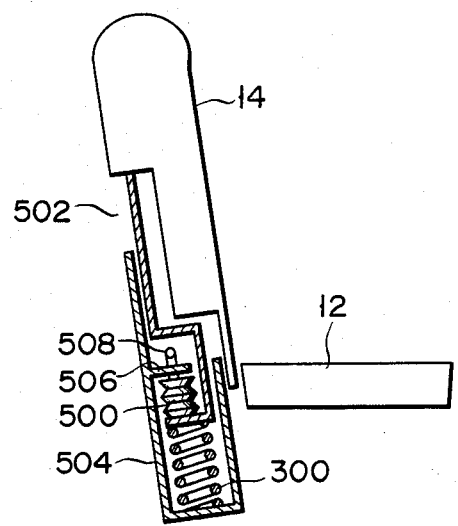
FIG. 8 is a partially sectional side view showing a further modification of the drive mechanism of the back support section shown in FIGS. 5 and 6.

FIG. 8 shows a drive mechanism of the back support section, which utilizes a flexible and extensible bellows 500 having a gas-tight outer film. In the case of FIG. 8, upper and lower members 502 and 504 as shown are different in shape from the upper and lower members 114 and 116 shown in FIGS. 5 and 6. More specifically, the upper plate 506 of the lower member 504 is secured to the back plate and is disposed above the bottom plate of the upper member 502. The bellows 500 is provided between the upper plate 506 and the bottom plate of the upper member 502. An inlet 508 of the bellows 500 is connected to a compressed air source (not shown).

When compressed air is supplied from the compressed air source into the bellows 500, the bellows 500 is extended between the upper plate 506 of the lower member 504 and the bottom plate of the upper member 502. As a result, a compression coil spring provided between the lower plate of the lower member 504 and the bottom plate of the upper member 502 is compressed, so that the upper member 502 is moved downwards.

The embodiments shown in FIGS. 1 to 6 are applied to a reclining type seat, in which the seating section is movable and also the back support section can be inclined. However, the invention can also be applied to a reclining type seat where the seating section is secured to the base and only the back support section can be inclined. In this case, the shoulder belt attachment position can be adjusted with the movement of the back support section.

The vehicle sheet according to the invention is applicable not only to cars but also to buses, and various other vehicles.

What is claimed is:

1. A seat belt apparatus for use with a vehicle seat having a backrest and a headrest, comprising:
   a pair of upper attaching units mounted on the top part of the backrest and spaced apart from each other in the lateral direction of the backrest, each of the upper attaching units including a housing and a rotary member disposed in the housing so as to be horizontally rotatable, one end of each of the rotary members adapted for projecting a predetermined distance in front of the backrest when the rotary member is rotated;
   a pair of lower attaching units mounted on the side surfaces of the vehicle seat in such a manner that the lower attaching units are lower than the upper attaching units;
   a pair of shoulder belts for holding the shoulders of a driver or passenger when he sits in the vehicle seat, one end of each shoulder belt being connected to said one end of the rotary member of the corresponding upper attaching unit, while the other end of each shoulder belt extends toward and is connected to the nearer one of the lower attaching units; and
   a waist belt, attached to the vehicle seat, for holding the waist of the driver or passenger.

2. The seat belt apparatus of claim 1, wherein: said vehicle seat supports said backrest so that said backrest is rotatable about an axis which is lateral to said seat and located toward the upper end of said backrest.

3. The seat belt apparatus of claim 1, wherein said waist belt for holding the waist of the driver or passenger has one of its ends attached to the side surface of said backrest and other of its ends removably attached to the other side surface of said backrest.

4. The seat belt apparatus of claim 1, wherein: each of said upper attaching units includes a hollow slidable member within which the rotary member of each attaching unit is secured, the slidable member having on its lower surface a female threaded portion extending laterally with respect to the backrest along its lower surface and includes a feed screw rotatably supported and laterally positioned on the top of said backrest so as to be in mesh with the female threaded portion so that the hollow slidable member may be laterally moved along said top of said backrest with the rotation of the feed screw.

5. The seat belt apparatus of claim 4, wherein: each of said upper attaching units further includes a post mounted in each of said hollow slidable members which extends through the rotary member within the slidable member and said rotary member is rotatable around said post, and said upper attaching unit includes a spring mounted between the post and said rotary member for biasing said rotary member in such direction that said shoulder belt attached to said rotary member is turned toward the side of said backrest and a latching means for releasably holding said rotary member in a position in which it projects in front of said backrest against the biasing force of said spring.

6. The seat belt apparatus of claim 4, wherein: each of said rotary members includes a means for buffering the shoulder belt attached thereto so that said belt may be pulled out from said rotary member a limited distance when the belt is pulled with sufficient force.

7. The seat belt apparatus of claim 4, wherein: each of said lower attaching units includes a housing mounted on one of said surfaces of said backrest and a slide member to which the end of a shoulder belt may be attached, said slide member releasably gripping said housing so that the vertical position of said slide member is adjustable.

* * * * *